US012374074B2

(12) United States Patent
Mishra et al.

(10) Patent No.: US 12,374,074 B2
(45) Date of Patent: Jul. 29, 2025

(54) METHOD AND ELECTRONIC DEVICE FOR AUTOMATICALLY GENERATING REGION OF INTEREST CENTRIC IMAGE

(71) Applicant: Samsung Electronics Co., Ltd., Suwon-si (KR)

(72) Inventors: Abhishek Mishra, Noida (IN); Sai Hemanth Kasaraneni, Noida (IN); Saurabh Kumar, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 17/962,170

(22) Filed: Oct. 7, 2022

(65) Prior Publication Data

US 2023/0237757 A1 Jul. 27, 2023

Related U.S. Application Data

(63) Continuation of application No. PCT/KR2022/012485, filed on Aug. 22, 2022.

(30) Foreign Application Priority Data

Jan. 13, 2022 (IN) .............................. 202241002055

(51) Int. Cl.
*G06V 10/25* (2022.01)
*G06T 3/40* (2024.01)
(Continued)

(52) U.S. Cl.
CPC ................ *G06V 10/25* (2022.01); *G06T 3/40* (2013.01); *G06T 7/50* (2017.01); *G06T 7/60* (2013.01);
(Continued)

(58) Field of Classification Search
CPC ...... G06V 10/25; G06V 10/764; G06V 10/86; G06V 10/82; G06V 20/70; G06T 3/40;
(Continued)

(56) References Cited

U.S. PATENT DOCUMENTS 9,008,433 B2  4/2015  Fork et al.
9,549,125 B1  1/2017  Goyal et al.
(Continued)

FOREIGN PATENT DOCUMENTS

CN  108810512 B  9/2019
EP  3 240 282 A2  11/2017
(Continued)

OTHER PUBLICATIONS

Dhamo et al., Semantic Image Manipulation Using Scene Graphs, arXiv, Apr. 7, 2020 (Year: 2020).*
(Continued)

*Primary Examiner* — Andrew M Moyer
*Assistant Examiner* — Caroline E. Depalma
(74) *Attorney, Agent, or Firm* — Jefferson IP Law, LLP

(57) ABSTRACT

A method for automatically generating a Region Of Interest (ROI) centric image in an electronic device is provided. The method includes receiving an image frame(s), where the image frame(s) includes a plurality of objects. Further, the method includes identifying a first ROI, a second ROI, and a non-ROI in the image frame(s). Further, the method includes rescaling the second ROI in the image frame(s), summarizing the non-ROI in the image frame(s), and automatically generating the ROI centric image, where the ROI centric image includes the rescaled-first ROI, the rescaled-second ROI, the rescaled-non-ROI, and the summarized non-ROI.

15 Claims, 12 Drawing Sheets

(51) Int. Cl.
  *G06T 7/50* (2017.01)
  *G06T 7/60* (2017.01)
  *G06T 7/70* (2017.01)
  *G06V 10/764* (2022.01)
  *G06V 10/86* (2022.01)
  *H04N 5/262* (2006.01)

(52) U.S. Cl.
  CPC ............. *G06T 7/70* (2017.01); *G06V 10/764*
    (2022.01); *G06V 10/86* (2022.01); *H04N*
    *5/2628* (2013.01); *G06T 2207/20076*
    (2013.01); *G06T 2207/20081* (2013.01); *G06T*
    *2207/20084* (2013.01)

(58) Field of Classification Search
  CPC .... G06T 7/50; G06T 7/60; G06T 7/70; G06T
    2207/20076; G06T 2207/20081; G06T
    2207/20084; H04N 5/2628
  See application file for complete search history.

(56) References Cited

U.S. PATENT DOCUMENTS

| | | | |
|---|---|---|---|
| 9,699,434 B2 | 7/2017 | Kim et al. | |
| 9,740,949 B1* | 8/2017 | Khosla | G06V 10/451 |
| 10,860,166 B2 | 12/2020 | Kim | |
| 11,087,186 B2 | 8/2021 | Schrier et al. | |
| 2014/0240553 A1 | 8/2014 | Pylvanainen et al. | |
| 2015/0063705 A1* | 3/2015 | Shankaramurthy | G06V 30/413 |
| | | | 382/195 |
| 2016/0112674 A1* | 4/2016 | Li | H04N 19/167 |
| | | | 375/240.13 |
| 2017/0236288 A1 | 8/2017 | Sundaresan et al. | |
| 2019/0042868 A1 | 2/2019 | Oesterreicher et al. | |
| 2021/0012110 A1* | 1/2021 | Chen | H04N 23/80 |
| 2021/0256314 A1 | 8/2021 | Javidi et al. | |
| 2021/0365707 A1* | 11/2021 | Mao | G06V 10/25 |
| 2022/0224917 A1 | 7/2022 | Ohashi et al. | |
| 2023/0009925 A1* | 1/2023 | Sekii | G06T 9/00 |
| 2023/0143034 A1* | 5/2023 | Wu | G06T 7/50 |
| | | | 345/423 |

FOREIGN PATENT DOCUMENTS

| | | | | |
|---|---|---|---|---|
| IN | 3869/CHE/2013 | | 3/2015 | |
| JP | 2009225359 A | * | 10/2009 | |
| JP | 2013-171539 A | | 9/2013 | |
| KR | 20150104288 A | * | 9/2015 | ............... G06T 1/00 |
| KR | 10-1992767 B1 | | 9/2019 | |
| WO | 2017/058579 A1 | | 4/2017 | |

OTHER PUBLICATIONS

Rodriguez et al., Automatic Detection of Repeated Objects in Images, 2021 IEEE International Conference on Image Processing (Year: 2021).*
International Search Report and Written Opinion dated Dec. 16, 2022, issued in International Application No. PCT/KR2022/012485.
Bhattacharya Subhabrata et al., A Holistic Approach to Aesthetic Enhancement of Photographs, XP 93211664, Oct. 1, 2011.
Vidya Setlur et al., Automatic Image Retargeting, XP 58363156, Dec. 8, 2005.
Dong Weiming et al., Summarization-Based Image Resizing by Intelligent Object Carving, XP 11532079, Jan. 1, 2014.
Ligang Liu et al., Optimizing Photo Composition, XP 71486979, Jun. 7, 2010.
Zhang Fang-Lue et al., Aesthetic Image Enhancement by Dependence-Aware Object Recomposition, XP 11529379, Nov. 1, 2013.
Iizuka S et al., Object Repositioning Based on the Perspective in a Single Image, XP 71488965, Jul. 14, 2014.
Islam Md Baharul et al., A survey of aesthetics-driven image recomposition, XP 36204146, May 13, 2016.
Indian Examination Report dated Aug. 28, 2024, issued in Indian Application No. 202241002055.
European Search Report dated Oct. 16, 2024, issued in European Application No. 22920751.9.

* cited by examiner

METHOD AND ELECTRONIC DEVICE FOR AUTOMATICALLY GENERATING REGION OF INTEREST CENTRIC IMAGE

CROSS-REFERENCE TO RELATED APPLICATION(S)

This application is a continuation application, claiming priority under § 365(c), of an International application No. PCT/KR2022/012485, filed on Aug. 22, 2022, which is based on and claims the benefit of an Indian Patent Application number 202241002055, filed on Jan. 13, 2022, in the Indian Intellectual Property Office, the disclosure of which is incorporated by reference herein in its entirety.

FIELD OF INVENTION

The disclosure relates to an electronic device. More particularly, the disclosure relates to a method and an electronic device for automatically generating a Region Of Interest (ROI) centric image.

BACKGROUND

In general, rapid advancements in electronic devices and image capturing technologies have made simpler for users to capture a wide range of images. There is an increasing demand among the users to capture not just an image of a subject but also an image with a variety of effects (for example, editing/resizing an object(s) in the image). An existing electronic device gives a variety of possibilities for automatically or manually editing/resizing objects (e.g., person, tree, etc.) in the image. Furthermore, the existing electronic device makes use of existing external tools such as Photoshop, Lightroom, or any other post-processing application to perform automatically editing/resizing objects. Furthermore, the existing electronic device makes use of user's skill and/or creativity to perform manual editing/resizing of objects. As a result, the existing electronic device must rely entirely on external tools and/or the user's skill and creativity.

FIG. 1A illustrates problems in existing image generation methods, according to the related art.

Consider an example scenario (1) of FIG. 1A in which the user of the electronic device wants to capture an image that appears like holding a sun on hand of the user at sunset. However, the user's object of interest (i.e., sun) is not caught, and the user is disappointed when the user sees a final outcome/taken image in which the sun is far away from the user's hand and the perspective required to capture the image is lacking. As a result, the user must recapture the image, which is often impossible since a moment (such as sunset time) has gone. Furthermore, modifying the size of the object (e.g., the sun) and adjusting it in a three-dimensional (3D) planar space is conceivable, but it takes a long time to obtain the desired aesthetics and naturalness in the image. As a result, most of the time, the user must seek assistance from specialists for editing and/or external tools as everyone is not an expert to manually edit/resize the object(s).

FIG. 1B illustrates problems in existing image generation methods, according to the related art.

FIG. 1C illustrates problems in existing image generation methods, according to the related art.

FIG. 1D illustrates problems in existing image generation methods, according to the related art.

Consider an example scenario (2) of FIG. 1B in which the user of the electronic device wants to capture an image of a family gathering at a riverbank. However, the user's object of interest (i.e., family gathering) is not caught as one of the family members (e.g., a boy with a jacket (2a)) is standing far away from other family members (2b). As a result, the user must modify the image/modify a position of the object(s) (e.g., one of the family members (2b)) in the 3D planar space.

The existing electronic device makes use of existing external tools and/or the user's skill and creativity to regenerate the image (3) of FIG. 1C and the image (4) of FIG. 1D with the required perspective but the regenerated image (3) of FIG. 1C and the regenerated image (4) of FIG. 1D is less convincing or doesn't look natural. For example, some family members (2b) are floating in air in the regenerated image (3). A size and the position of a few object(s) (e.g., the boy with the jacket (2a)) looks abnormal in the regenerated image (4).

Thus, it is desired to provide a useful alternative for automatic image generation.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to automatically generate, by an electronic device, a Region Of Interest (ROI) centric image, where the ROI centric image comprises a first ROI, a second ROI, a non-ROI, a rescaled-each ROI (e.g., movement in x, y, and z-axis), and a summarized non-ROI (e.g., remove redundant parts of the image which can be multiple similar layers across z-axis or say remove unwanted layers). The first ROI is identified based on an object importance score, the second ROI is identified based on an object of interest of the first ROI (e.g., subject's viewpoint), and the non-ROI is identified based on a highest redundancy score and the object importance score using a Machine Learning (ML) model. As a result, the automatically generated ROI centric image includes more information and increases aesthetic value of captured image by also keeping into consideration an original viewpoint of a user of the electronic device. So, the electronic device does not rely entirely on external tools and/or user's skill and creativity to modify the captured image, which enhances user's experience.

Additional aspects will be set forth in part in the description which follows and, in part, will be apparent from the description, or may be learned by practice of the presented embodiments.

In accordance with an aspect of the disclosure, a method automatically generating a Region Of Interest (ROI) centric image in an electronic device is provided. The method includes receiving, by the electronic device, an image frame(s), where the image frame(s) includes a plurality of objects (e.g., person, tree, etc.). Further, the method includes identifying, by the electronic device, a first ROI, a second ROI, and a non-ROI in the image frame(s). Further, the method includes rescaling, by the electronic device, each ROI in the image frame(s). Further, the method includes summarizing, by the electronic device, the non-ROI in the image frame(s). Further, the method includes automatically generating, by the electronic device, the ROI centric image, where the ROI centric image includes the rescaled-first ROI, the rescaled-second ROI, the rescaled-non-ROI, and the summarized non-ROI.

In an embodiment, the plurality of objects comprises three-dimensional (3D) location information and the 3D location information is identified by detecting, by the electronic device, the plurality of objects presented in the image frame(s), determining, by the electronic device, two-dimensional (2D) coordinates information of the plurality of detected objects, where the 2D coordinates information includes center information, height information, width information, and tag information, and where the 2D coordinates information is detected by a Machine Learning (ML) model, identifying, by the electronic device, a depth of the plurality of detected objects using a camera(s) of the electronic device, determining, by the electronic device, a relative distance between each object of the plurality of detected objects using a triangulation mechanism, and identifying, by the electronic device, the 3D-location information of the plurality of objects presented in the image frame(s) along with object categorization by using the 2D coordinates information, the identified depth of the plurality of detected objects, and the determined relative distance between each object, where the tag information is used to categorize each object.

In an embodiment, the first ROI is identified based on an object importance score, the second ROI is identified based on an object of interest of the first ROI, and the non-ROI is identified based on a highest redundancy score and the object importance score using the ML model.

In an embodiment, the second ROI is identified based on the object of interest of the first ROI includes determining, by the electronic device, a probability of interest of the at least one first ROI on each object based on a plurality of characteristics of each object, ranking, by the electronic device, the determined probability, and selecting, by the electronic device, an object(s) having a highest rank, where the object(s) used as the second ROI to rescale.

In an embodiment, the plurality of characteristics includes relative position information between each object, an object looking towards another object, the object pointing towards another object, a relationship between each object, and user-specific parameters, where the user-specific parameters include an image capturing pattern or history of a user of the electronic device.

In an embodiment, the method includes generating, by the electronic device, a scene graph associated with the plurality of objects, applying, by the electronic device, a relation classifier on the generated scene graph, and determining, by the electronic device, the relationship between each pair of objects of the plurality of objects using the relation classifier.

In an embodiment, where rescaling, by the electronic device, each ROI in the image frame(s) includes extracting, by the electronic device, a relationship between each pair of objects of the plurality of objects, determining, by the electronic device, an actual size of each object presented in the image frame(s) and an actual Z-order of each object presented in the image frame(s), generating, by the electronic device, a scene graph based on the plurality of detected objects and the actual size of each object, generating, by the electronic device, a textual knowledge graph based on the extracted relationship between each object and the actual Z-order of each object, and rescaling, by the electronic device, the actual size of the second ROI and the actual Z-order of the second ROI by using the generated scene graph and the generated textual knowledge graph, to obtain target size and target Z-order respectively.

In an embodiment, where summarizing, by the electronic device, the non-ROI in the image frame(s) includes determining, by the electronic device, an object importance score associated with each object, masking, by the electronic device, each object based on the 3D-location information, determining, by the electronic device, the non-ROI based on the object importance score, determining, by the electronic device, a highest redundancy score associated with the non-ROI, where the highest redundancy score is determined by the ML model, and summarizing, by the electronic device, the non-ROI in the image frame(s), where the non-ROI includes the highest redundancy score.

In an embodiment, where automatically generating, by the electronic device, the ROI centric image includes identifying, by the electronic device, the plurality of objects, where the plurality of objects includes the first ROI, the rescaled-second ROI, and the summarized non-ROI, stitching, by the electronic device, the identified plurality of objects to automatically generate the ROI centric image, and generating, by the electronic device, the ROI centric image.

In accordance with another aspect of the disclosure, an electronic device for automatically generating the ROI centric image is provided. The electronic device includes a 3D planar image controller coupled with a processor and a memory. The 3D planar image controller is configured to receive the image frame(s), where the image frame(s) includes the plurality of objects. Further, the 3D planar image controller is configured to identify the first ROI, the second ROI, and the non-ROI in the image frame(s). Further, the 3D planar image controller is configured to rescale the second ROI in the image frame(s). Further, the 3D planar image controller is configured to compress the non-ROI in the image frame(s). Further, the 3D planar image controller is configured to automatically generate the ROI centric image, where the ROI centric image includes the rescaled-first ROI, the rescaled-second ROI, the rescaled-non-ROI, and the summarized non-ROI.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

Figure 1A:
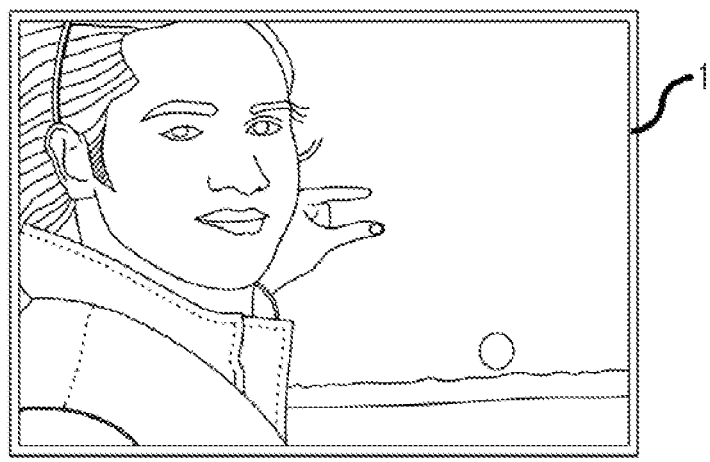
FIG. 1A illustrates problems in existing image generation methods, according to the related art.
Figure 1B:
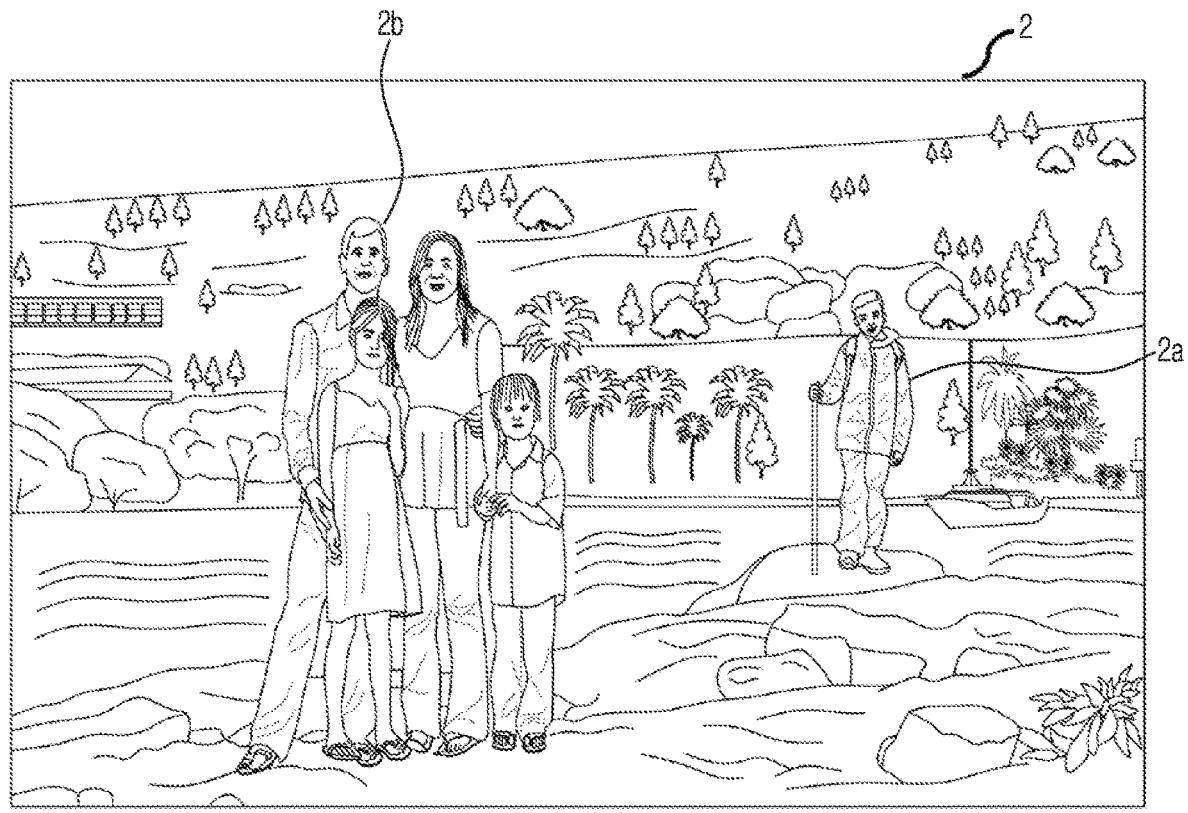
FIG. 1B illustrates problems in existing image generation methods, according to the related art.
Figure 1C:
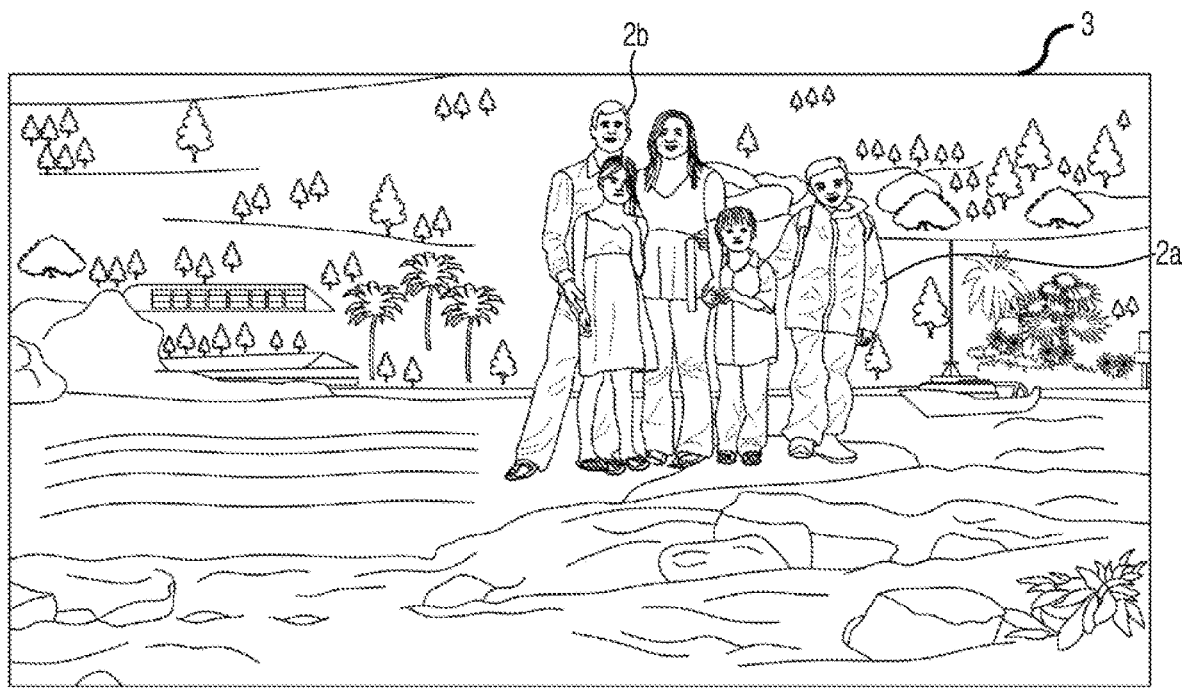
FIG. 1C illustrates problems in existing image generation methods, according to the related art.
Figure 1D:
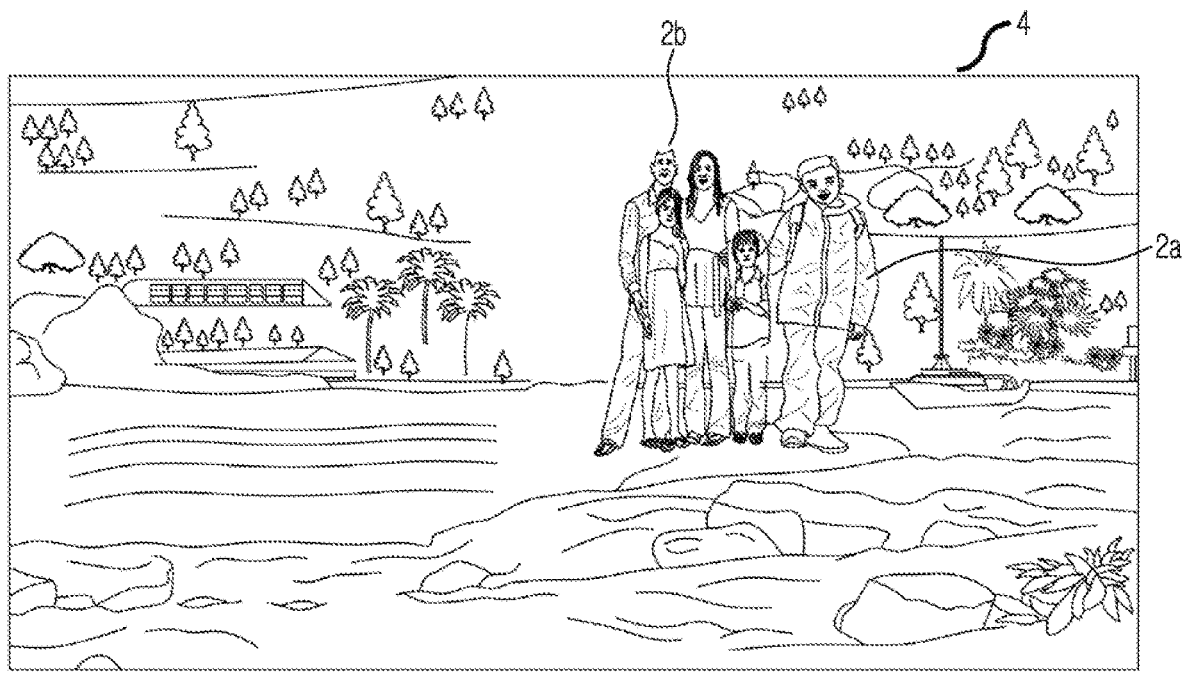
FIG. 1D illustrates problems in existing image generation methods, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "machine learning (ML) engine" and "ML model" are used interchangeably and mean the same. Throughout this disclosure, the terms "camera" and "camera sensor" are used interchangeably and mean the same. Throughout this disclosure, the terms "object(s)" and "ROI(s)" are used interchangeably and may mean the same.

Accordingly, embodiments herein disclose a method automatically generating a Region Of Interest (ROI) centric image in an electronic device. The method includes receiving, by the electronic device, an image frame(s), where the image frame(s) includes a plurality of objects (e.g., person, tree, etc.). Further, the method includes identifying, by the electronic device, a first ROI, a second ROI, and a non-ROI in the image frame(s). Further, the method includes rescaling, by the electronic device, each in the image frame(s). Further, the method includes summarizing, by the electronic device, the non-ROI in the image frame(s). Further, the method includes automatically generating, by the electronic device, the ROI centric image, where the ROI centric image includes the rescaled-first ROI, the rescaled-second ROI, the rescaled-non-ROI, and the summarized non-ROI.

Accordingly, the embodiments herein provide the electronic device for automatically generating the ROI centric image. The electronic device includes a three-dimensional (3D) planar image controller coupled with a processor and a memory. The 3D planar image controller is configured to receive the image frame(s), where the image frame(s) includes the plurality of objects. Further, the 3D planar image controller is configured to identify the first ROI, the second ROI, and the non-ROI in the image frame(s). Further, the 3D planar image controller is configured to rescale the second ROI in the image frame(s). Further, the 3D planar image controller is configured to compress the non-ROI in the image frame(s). Further, the 3D planar image controller is configured to automatically generate the ROI centric image, where the ROI centric image includes the rescaled-first ROI, the rescaled-second ROI, the rescaled-non-ROI, and the summarized non-ROI.

Unlike existing methods and systems, the proposed method allows the electronic device to automatically generate the Region Of Interest (ROI) centric image, where the ROI centric image comprises the first ROI, the rescaled-second ROI (e.g., movement in x, y, and z-axis), and the summarized non-ROI (e.g., remove redundant parts of the image which can be multiple similar layers across z-axis or say remove unwanted layers). The first ROI is identified based on an object importance score, the second ROI is identified based on an object of interest of the first ROI (e.g., subject's viewpoint), and the non-ROI is identified based on a highest redundancy score and the object importance score using a Machine Learning (ML) model. As a result, the automatically generated ROI centric image includes more information and increases aesthetic value of captured image by also keeping into consideration an original viewpoint of a user of the electronic device. So, the electronic device does not rely entirely on external tools and/or the user's skill and creativity to modify the captured image and enhance the user's experience.

Unlike existing methods and systems, the proposed method doesn't rely on a user's input and doesn't specific to a particular object specified by the user for editing the image. The proposed method changes an aesthetic appeal of the captured image by changing a size of the object as per the object's relation with surrounding layers and scene descriptions.

Referring now to the drawings, and more particularly to FIGS. 2 through 9, where similar reference characters denote corresponding features consistently throughout the figures, there are shown preferred embodiments.

Figure 2:
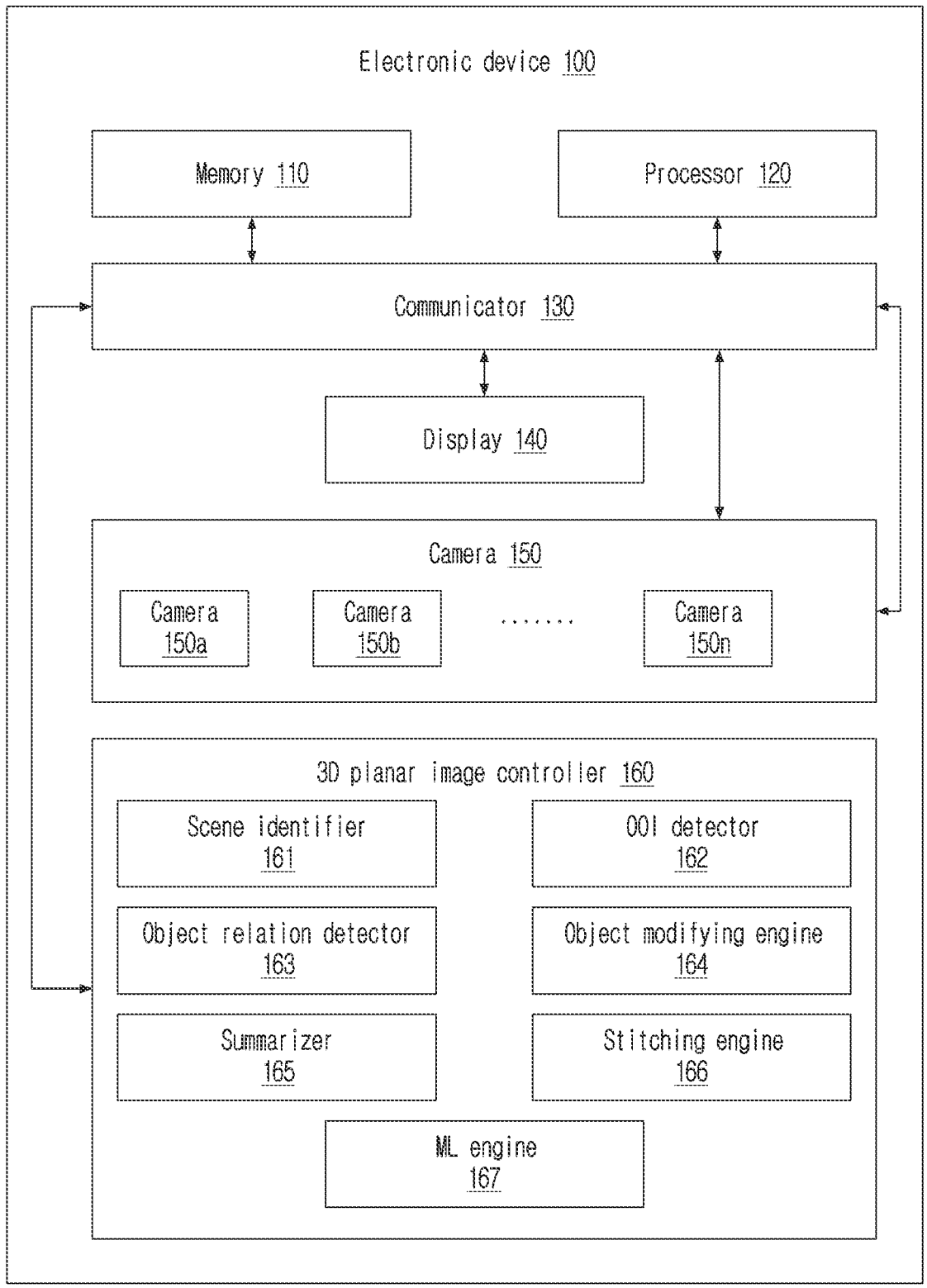
FIG. 2 illustrates a block diagram of an electronic device for automatically generating a Region Of Interest (ROI) centric image, according to an embodiment of the disclosure.

FIG. 2 illustrates a block diagram of an electronic device for automatically generating a Region Of Interest (ROI) centric image, according to an embodiment of the disclosure. Examples of the electronic device (100) include, but are not limited to a smartphone, a tablet computer, a Personal Digital Assistance (PDA), an Internet of Things (IoT) device, a wearable device, etc.

Referring to FIG. 2, an electronic device (100) includes a memory (110), a processor (120), a communicator (130), a display (140), a camera (150) (e.g., Charge-Coupled Device (CCD), Electron-Multiplying Charge-Coupled Device (EMCCD), Complementary Metal-Oxide-Semiconductor (CMOS), etc.), and a 3D planar image controller (160).

In an embodiment, the memory (110) stores a first ROI, a second ROI, a non-ROI, a two-dimensional (2D) coordinates information of each object, depth information of each object, a relative distance between each object, 3D-location information of each object, a probability of interest of the at least one first ROI on each object, a plurality of characteristics, an object importance score, an object of interest, a highest redundancy score, an actual size of each object, an actual Z-order of each object, rescaled actual size of each object, and rescaled actual Z-order of each object. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage.

The processor (120) communicates with the memory (110), the communicator (130), the display (140), the camera (150), and the 3D planar image controller (160). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) is configured for communicating internally between internal hardware components and with external devices (e.g., server, etc.) via one or more networks (e.g., Radio technology). The communicator (130) includes an electronic circuit specific to a standard that allows wired or wireless communication.

The 3D planar image controller (160) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the 3D planar image controller (160) includes a scene identifier (161), an Object Of Interest (OOI) detector (162), an object relation detector (163), an object modifying engine (164), a summarizer (165), a stitching engine (166), and an ML model (167).

The scene identifier (161) receives an image frame(s) from the camera (150), the image frame(s) includes a plurality of objects (e.g., person, tree, etc.). Further, the scene identifier (161) detects the plurality of objects presented in the image frame(s). Further, the scene identifier (161) determines the 2D coordinates information of the plurality of detected objects, where the 2D coordinates information includes center information, height information, width information, and tag information, and the 2D coordinates information is detected by the ML model (167) (e.g., CenterNet, You only look once (YOLO)). Further, the scene identifier (161) identifies the depth of the plurality of detected objects using the camera (150) of the electronic device (100). Further, the scene identifier (161) determines the relative distance between each object of the plurality of detected objects using a triangulation mechanism. Further, the scene identifier (161) identifies the 3D-location information of the plurality of objects presented in the image frame(s) along with object categorization (e.g., person, tree, cow, etc.) by using the 2D coordinates information, the identified depth of the plurality of detected objects, and the determined relative distance between each object, where the tag information is used to categorize each object.

The OOI detector (162) identifies the first ROI, the second ROI, and the non-ROI in the image frame(s). The OOI detector (162) identifies first ROI based on the object importance score, the second ROI based on the object of interest of the first ROI, and the non-ROI based on the highest redundancy score and the object importance score using the ML model (167). Further, the OOI detector (162) determines the probability of interest of the at least one first ROI on each object based on the plurality of characteristics. The plurality of characteristics includes relative position information between each object, an object looking towards another object (e.g., a user is looking at the Moon), the object pointing towards the object (e.g., the user is pointing towards the Moon), a relationship between each object, and user-specific parameters. The user-specific parameters include an image capturing pattern or history of the user of the electronic device (100). For example, if the user (e.g., first ROI) of the electronic device (100) captures the images of the Moon frequently, then the Moon (e.g., second ROI) is the object of interest.

The object relation detector (163) generates a scene graph associated with the plurality of objects. Further, the object relation detector (163) applies a relation classifier (e.g., ML model (167)) on the generated scene graph. Further, the object relation detector (163) determines the relationship between each pair of objects of the plurality of objects using the relation classifier. The scene graph is a structured formal graphical representation of the image in which objects (e.g., dog) are represented as nodes and pairwise interactions (e.g., playing with) are represented as edges.

The object modifying engine (164) extracts the relationship between each pair of objects of the plurality of objects. Further, the object modifying engine (164) determines the actual size of each object presented in the image frame(s) and the actual Z-order of each object presented in the image frame(s). Further, the object modifying engine (164) generates the scene graph based on the plurality of detected objects in the image frame(s) and the actual size of each object. Further, the object modifying engine (164) generates a textual knowledge graph based on the extracted relationship between each object and the actual Z-order of each object. The textual knowledge graph is a structured formal graphical representation of a text in which nodes represent items and edges reflect pairwise relationships. Further, the object modifying engine (164) rescales the actual size of the second ROI and the actual Z-order of the second ROI by using the generated scene graph and the generated textual knowledge graph.

The summarizer (165) determines the object importance score associated with each object using the ML model (167). Further, the summarizer (165) masks each object based on the 3D-location information of each object. Further, the summarizer (165) determines the non-ROI based on the object importance score. Further, the summarizer (165) determines the highest redundancy score associated with the non-ROI using the ML model (167). Further, the summarizer (165) compresses the non-ROI in the image frame(s). The non-ROI includes the highest redundancy score.

The stitching engine (166) receives the plurality of objects, the plurality of objects includes the first ROI, the rescaled-second ROI, and the summarized non-ROI. Further, the stitching engine (166) stitches the received plurality of objects to generate the ROI centric image and automatically generates the ROI centric image.

The ML model (167) may be implemented through an Artificial Intelligence (AI) model. A function associated with AI may be performed through the non-volatile memory, the volatile memory, and the processor. One or a plurality of processors control the processing of the input data (e.g., image frame(s)) in accordance with a predefined operating rule or AI model stored in the non-volatile memory and the volatile memory. The predefined operating rule or artificial intelligence model is provided through training or learning. Here, being provided through learning denotes that, by applying a learning mechanism to a plurality of learning data, a predefined operating rule or AI model of a desired characteristic is made. The learning may be performed in a device itself in which AI according to an embodiment is performed, and/o may be implemented through a separate server/system. The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning mechanism is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 2 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the disclosure. One or more components can be combined to perform the same or substantially similar function to automatically generate the ROI centric image.

Figure 3:
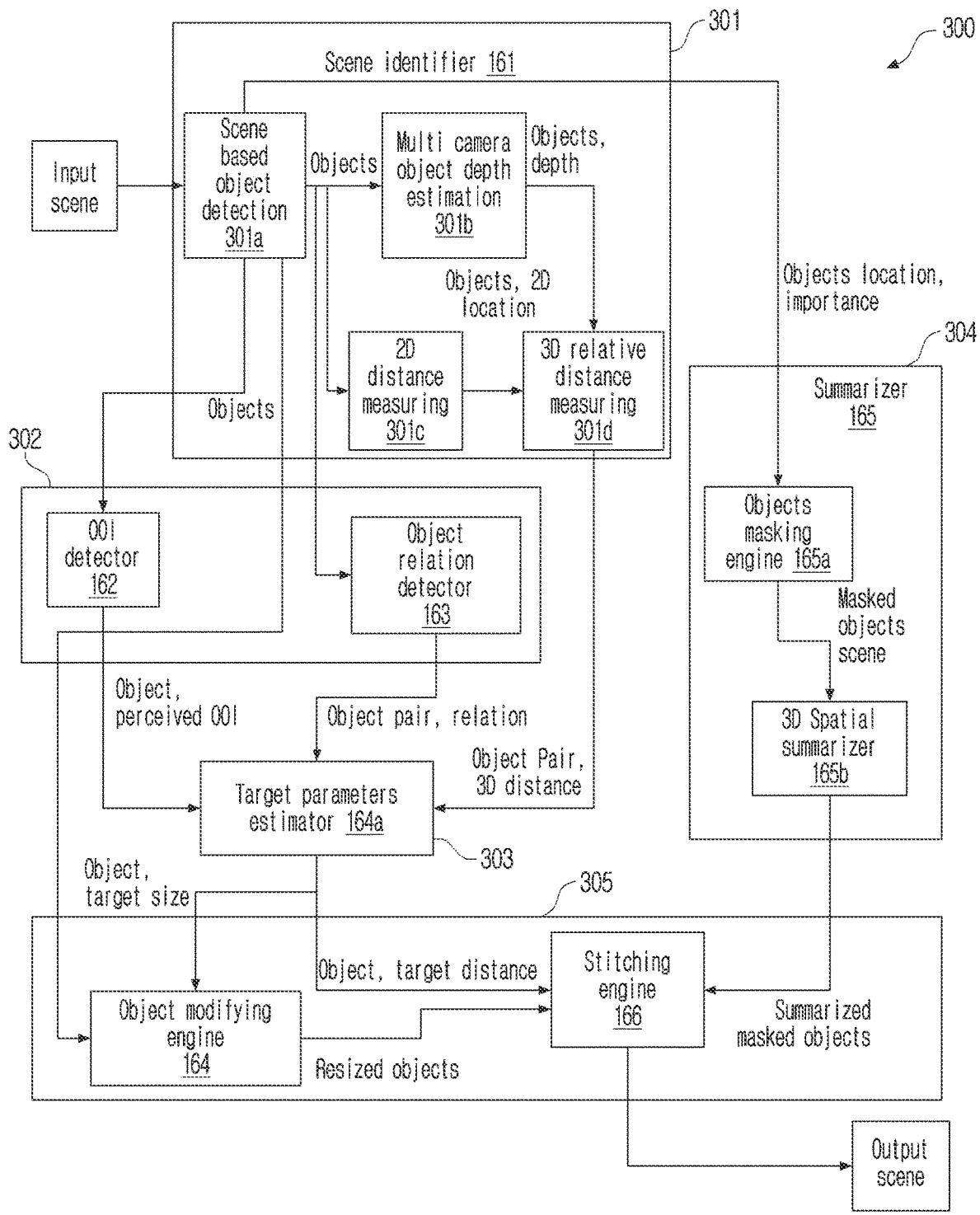
FIG. 3 is a flow diagram illustrating a method for automatically generating the ROI centric image, according to an embodiment of the disclosure.

FIG. 3 is a flow diagram illustrating a method for automatically generating the ROI centric image, according to an embodiment of the disclosure. The electronic device (100) performs operations 301 to 305.

Referring to FIG. 3 depicting flow diagram 300, at operation 301, the method includes receiving, by the scene identifier (161), the image frame(s) (input scene). The scene identifier (161) then detects (301a) the plurality of objects presented in the image frame(s). The scene identifier (161) then identifies the depth (301b) of the plurality of detected objects using the camera(s) (e.g., 150a, 150b, or . . . 150n) and determines the 2D coordinates information (301c) of the plurality of detected objects. The scene identifier (161) then identifies the 3D-location information (301d) of the plurality of objects presented in the image frame(s) along with object categorization by using the 2D coordinates information (301c), the identified depth (301b) of the plurality of detected objects, and the determined relative distance between each object.

At operation 302, the method includes identifying, by the OOI detector (162), the first ROI, the second ROI, and the non-ROI in the image frame(s). The first ROI is identified based on the object importance score, the second ROI is identified based on the object of interest (perceived OOI) of the first ROI, and the non-ROI is identified based on the highest redundancy score and the object importance score using the ML model (167). Further, the method includes determining, by the object relation detector (163), the relationship between each pair of objects of the plurality of objects using the relation classifier.

At operation 303, the method includes determining, by a target parameters estimator (164a) of the object modifying engine (164), the actual size of each object presented in the image frame(s) and the actual Z-order of each object presented in the image frame(s) based on the received information (e.g., object, perceived OOI, object pair/relation, 3D-location information) from the scene identifier (161), the OOI detector (162), and the object relation detector (163).

At operation 304, the method includes masking, by an object masking engine (165a) of the summarizer (165), each object based on the received information (e.g., the 3D-location information and object importance score associated with each object) from the scene identifier (161). Further, the method includes determining, by a 3D-spatial summarizer (165b) of the summarizer (165), the non-ROI based on the object importance score, the highest redundancy score associated with the non-ROI. Further, the method includes summarizing, by the 3D-spatial summarizer (165b) the non-ROI in the image frame(s) where the non-ROI includes the highest redundancy score.

At operation 305, the method includes rescaling, by the object modifying engine (164), the actual size of the second ROI and the actual Z-order of the second ROI based on the received information (e.g., object, target size (i.e., actual size), target distance (i.e., actual Z-order)) from the target parameters estimator (164a). Further, the method includes receiving, by the stitching engine (166), the plurality of objects, the plurality of objects includes the first ROI, the rescaled-second ROI, and the summarized non-ROI from the object modifying engine (164) and the 3D-spatial summarizer (165b). Further, the method includes automatically generating, by the stitching engine (166), the ROI centric image based on the received plurality of objects from the object modifying engine (164) and the 3D-spatial summarizer (165b).

Figure 4:
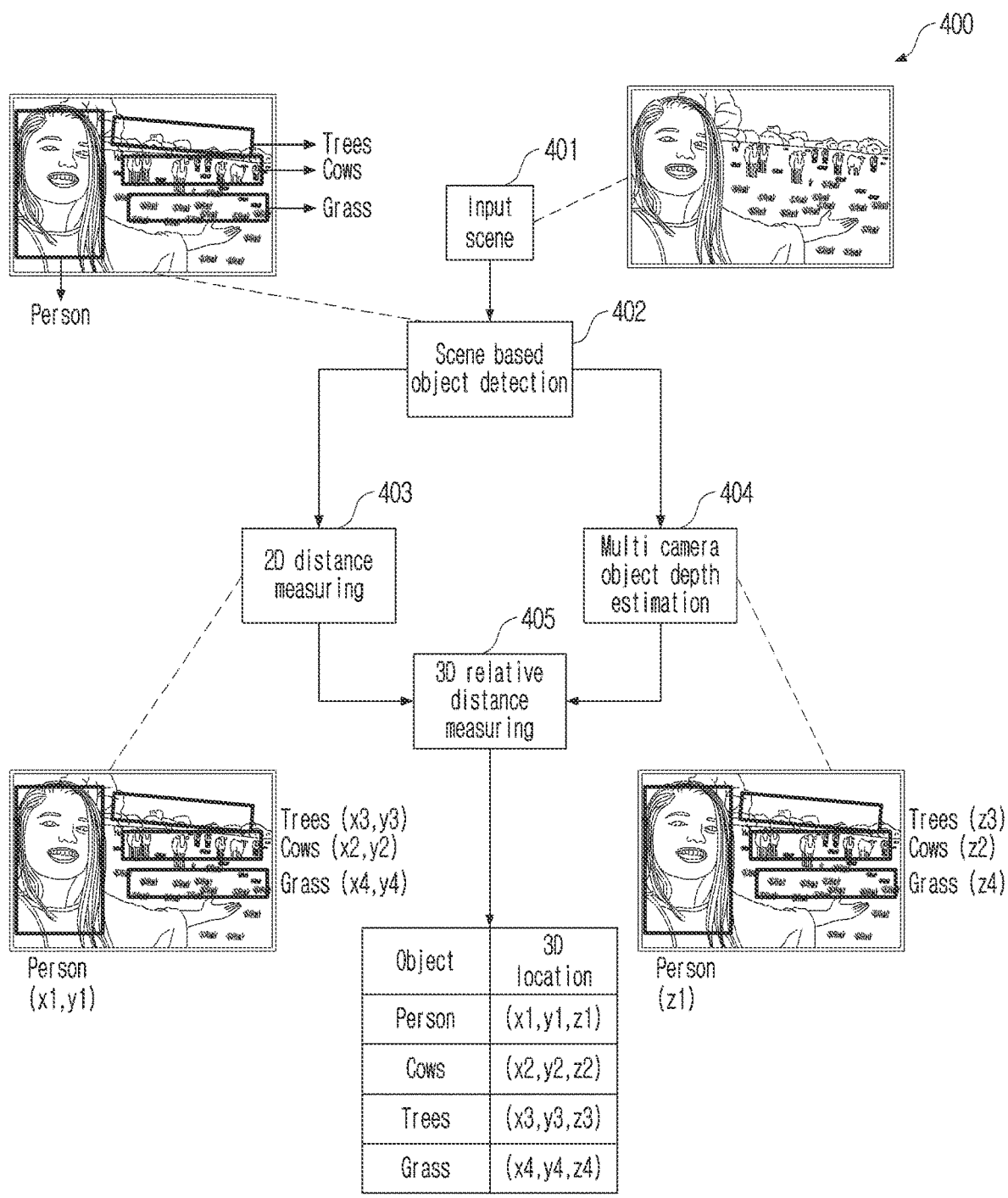
FIG. 4 is an example flow diagram illustrating various operations for identifying three-dimensional (3D)-location information in an image frame(s), according to an embodiment of the disclosure.

FIG. 4 is an example flow diagram illustrating various operations for identifying the 3D-location information in the image frame(s) (i.e., input scene), according to an embodiment of the disclosure. The scene identifier (161) performs various operations 401 to 405.

Referring to FIG. 4 depicting flow diagram 400, at operations 401 and 402, the scene identifier (161) recognizes the object(s) (i.e., trees, cows, grass, person) in the image frame(s) and predicts the X, Y coordinates of a center, height, and width of the object, as well as object tagging using the ML model (167) (e.g., CenterNet, YOLO). At operation 403, the scene identifier (161) determines the relative distance between each object of the plurality of detected objects using the triangulation mechanism based on the predicted X, Y coordinates (e.g., person (X1, Y1), cows (X2, Y2), etc.), which takes into account the focal length of the lens, the object(s), and their relative relationship between their pixels in the image frame(s).

At operation 404, the scene identifier (161) identifies the depth of the object(s) (e.g., person (Z1), cows (Z2), etc.) in the image frame(s) using a Deep Neural Networks (Convolutional neural network) and assigning the camera (150) according to the depth. At operation 405, the scene identifier (161) identifies exact positions of multiple objects (e.g., person (X1, Y1, Z1), etc.) in the image frame(s) by utilizing received information i.e., X, Y coordinates, and Z coordinate along with the object categorization using the tagging.

Figure 5:
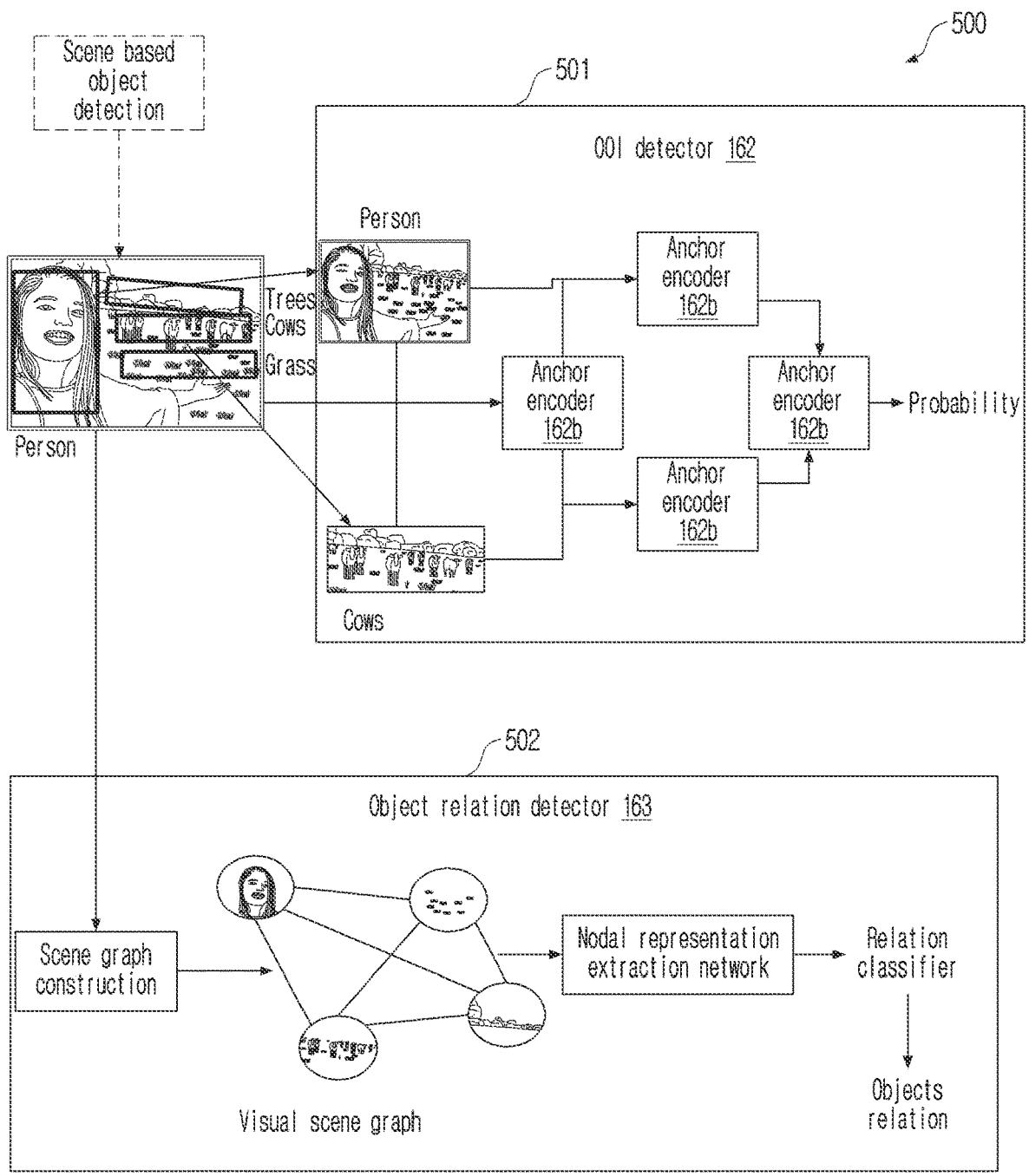
FIG. 5 is an example flow diagram illustrating various operations for identifying an object of interest of a first ROI and a relationship between each object of a plurality of objects, according to an embodiment of the disclosure.

FIG. 5 is an example flow diagram illustrating various operations for identifying the object of interest of the first ROI and the relationship between each pair of objects of the plurality of objects, according to an embodiment of the disclosure. The OOI detector (162) performs various operations (501) of the flow diagram (500). The object relation detector (163) performs various operations (502) of the flow diagram (500).

Referring to FIG. 5, at operation 501, a position encoder (162a) of an OOI detector (162) receives information (e.g., object) from a scene identifier (161). The position encoder (162a) then selects an anchor-object(s) and then iterates over the remaining objects (or say subject) to form pair of the anchor-object(s) with the remaining objects to further determine a probability of anchor objects interest on the remaining objects. The position encoder (162a) repeats this for all possible anchor-object(s). Further, the position encoder (162a) determines a relative positional vector from the anchor-object(s) to the remaining objects and encodes into a compact representation using feed-forward layers (e.g., feed-forward neural network) for providing relative positional information to an anchor encoder (162b) of the OOI detector (162) and a subject encoder (162c) of the OOI detector (162). The positional vector of the object is a vector representation of the object's encoded location in 2D space with respect to the origin. The relative positional vector from object-1 to object-2 is a vector representation of the location of object-2 in the 2D space with regard to object-1.

The anchor encoder (162b) and the subject encoder (162c) are independent deep neural networks (e.g., Deep CNN). The anchor encoder (162b) outputs a representational vector for an anchor image(s) associated with the relative position encoding input. The representational vector of an image is a numerical vector of predefined length containing values in which image characteristics are encoded. Similarly, the subject encoder (162c) outputs a representation vector for a subject image(s). An inner product (162d) of the OOI detector (162) normalizes representation vectors using a cosine similarity score and determines the probability of interest of the at least one first ROI on each object, as shown in Table 1.

TABLE 1

| Anchor-object | Remaining objects regard to anchor-object (subject) | Probability of interest of the first ROI on each object |
|---|---|---|
| Person | Cows | 0.98 |
| Person | Grass | 0.23 |
| Cows | Person | 0.41 |

The cosine similarity is a metric (e.g., Cos (x, y)=x·y/ ‖x‖*‖y‖) that may be used to determine how similar data objects are regardless of their size, where x·y Equals product (dot) of vectors 'x' and 'y', ‖x‖ and ‖y‖ are the lengths of the two vectors 'x' and 'y', respectively. The cross product of the two vectors 'x' and 'y' is ‖x‖*‖y‖.

At operation 502, the object relation detector (163) generates the scene graph associated with the plurality of objects. Further, the object relation detector (163) applies the relation classifier (e.g., ML model (167)) on the generated scene graph. Further, the object relation detector (163) determines the relationship between each pair of objects of the plurality of objects using the relation classifier, as shown in Table 2.

TABLE 2

| Object-1 | Object-2 | Relation classifier |
|---|---|---|
| Person | Cows | Pointing to |
| Cows | Grass | Standing on |
| Cows | Person | Are behind |

Figure 6:
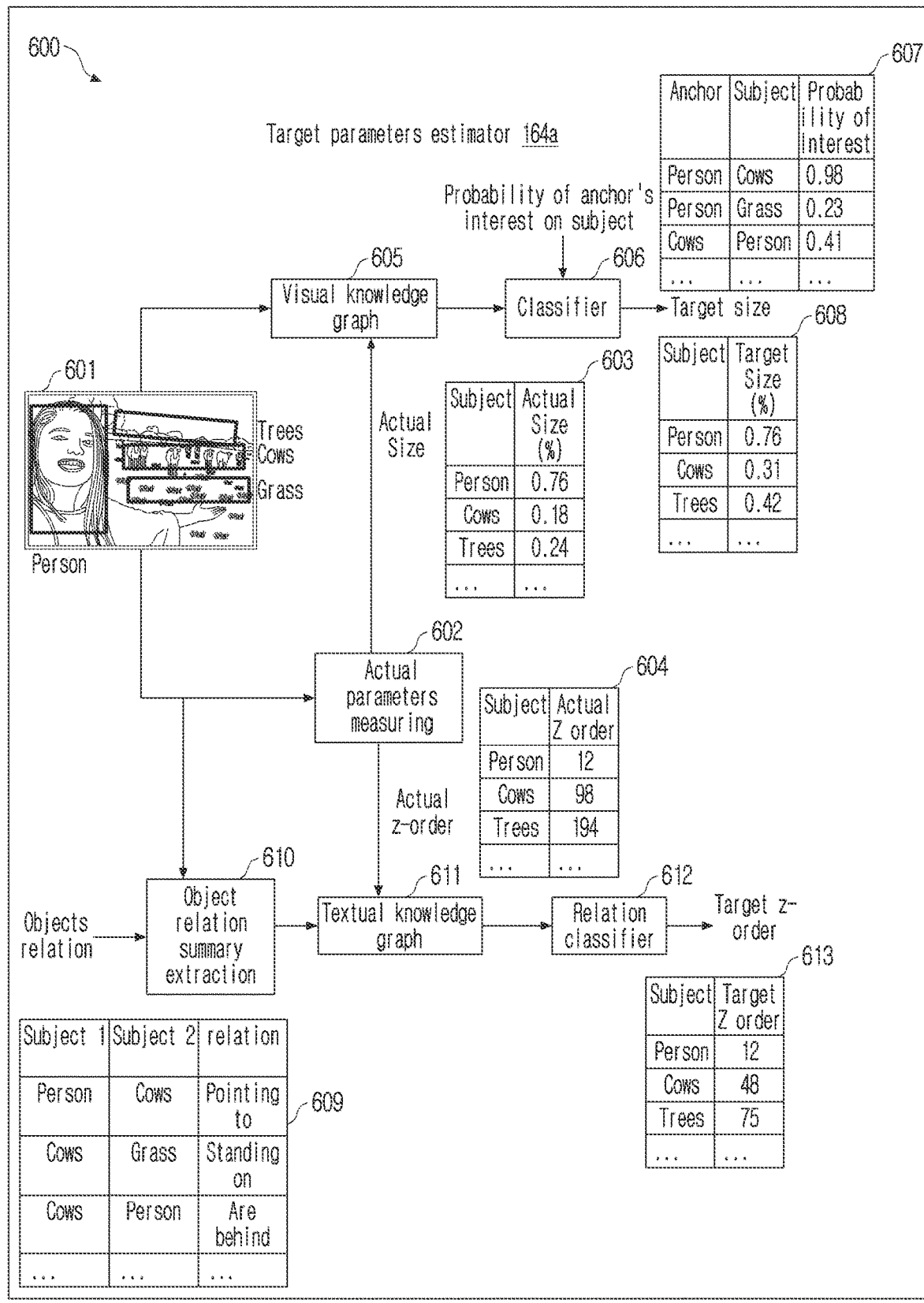
FIG. 6 is an example flow diagram illustrating various operations for rescaling a second ROI in the image frame(s), according to an embodiment of the disclosure.

FIG. 6 is an example flow diagram illustrating various operations for rescaling the second ROI in the image frame(s), according to an embodiment of the disclosure. The target parameters estimator (164a) performs various operations (601-613) of the flow diagram (600).

The target parameters estimator (164a) determines (602) the actual size (603) of each object presented in the image frame (601) and the actual Z-order (604) of each object presented in the image frame (601). The target parameters estimator (164a) then generates the scene graph (605) based on the plurality of detected objects in the image frame (601) and the actual size (603) of each object. The target parameters estimator (164a) then rescales the actual size of the second ROI (608) based on the received information at a classifier (606)/the ML model (167) (e.g., probability of interest of the at least one first ROI on each object (607)) from the OOI detector (162). For example, the size of cows changed from 0.18 to 0.31.

The target parameters estimator (164a) receives the relationship between each object (609) from the object relation detector (163) and extracts the relationship (610) between each object. For example, the cows roaming on the grass in front of the tress are being pointed to by the person in a foreground. The target parameters estimator (164a) then generates the textual knowledge graph (611) based on the extracted relationship (610) between each object and the actual Z-order (604) of each object. The target parameters estimator (164a) then rescales the Z-order (604) of the second ROI (608) based on the received information at a classifier (612)/the ML model (167). For example, the Z-order of cows changed from 98 to 48.

Figure 7:
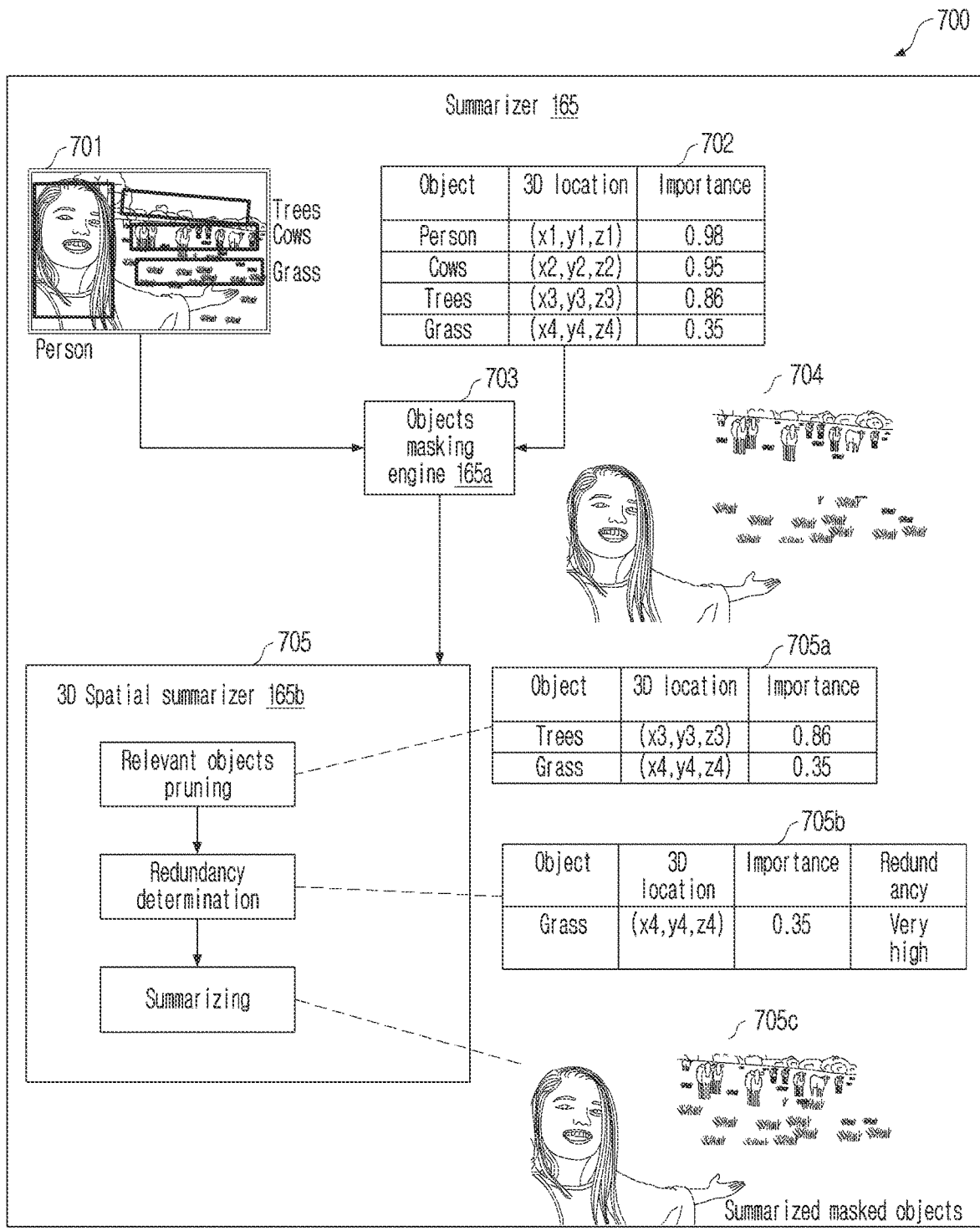
FIG. 7 is an example flow diagram illustrating various operations for summarizing a non-ROI in the image frame(s), according to an embodiment of the disclosure.

FIG. 7 is an example flow diagram illustrating various operations for summarizing the non-ROI in the image frame (s), according to an embodiment of the disclosure. The summarizer (165) performs various operations (701-705) of the flow diagram (700).

The summarizer (165) determines the object importance score associated with each object using the ML model (167) (or this operation may be performed by the scene identifier (161)). The object masking engine (165a) masks each object (703 and 704) based on the received information (e.g., the 3D-location information of the detected object(s) in the image frame (701) and object importance score (702) associated with each object) from the scene identifier (161).

The 3D-spatial summarizer (165b) then prunes relevant objects (i.e., ROI) based on the object importance score using the ML model (167) (e.g., the feed-forward neural network). The 3D-spatial summarizer (165b) then divides irrelevant objects (705a) (i.e., non-ROI) into multiple fragments and compares fragments for redundancy using the ML model (167) (e.g., Visual Geometry Group-16 layers (VGG16) transfer learning and cosine similarity). The object(s) having the highest redundancy scores are output (705b). The 3D-spatial summarizer (165b) then summarizes/compresses repetitive object fragments in the object(s) (non-ROI/object(s) with highest redundancy scores).

Figure 8:
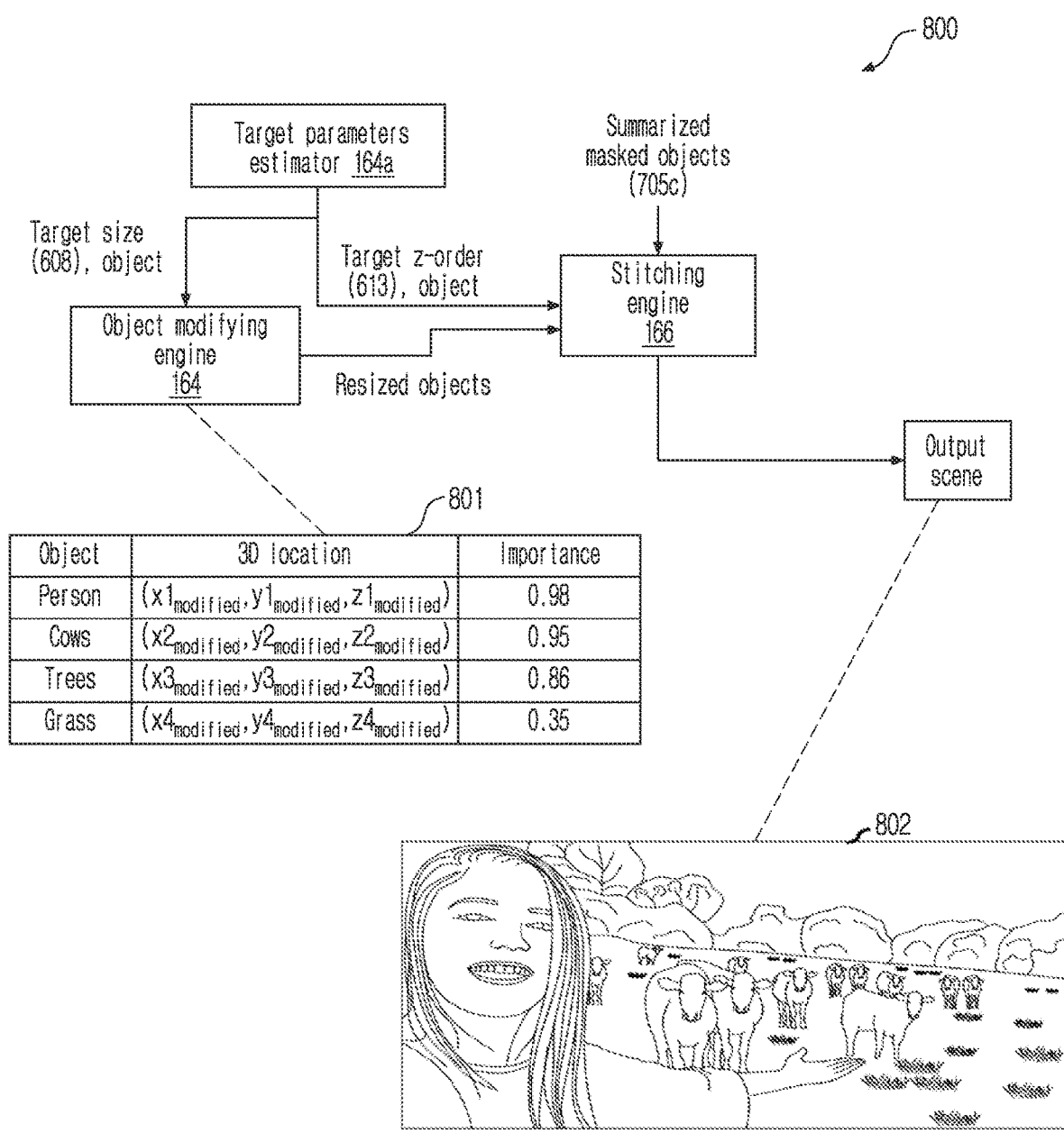
FIG. 8 is an example flow diagram illustrating various operations for automatically generating the ROI centric image, according to an embodiment of the disclosure.

FIG. 8 is an example flow diagram illustrating various operations for automatically generating the ROI centric image, according to an embodiment of the disclosure.

The stitching engine (166) receives the plurality of objects includes the first ROI from the scene identifier (161), the rescaled-second ROI (801) (e.g., target size (608), target Z-order (613), etc.) from the object modifying engine (164)/ the target parameters estimator (164a), and the summarized non-ROI (e.g., summarized masked objects (705c)) from the 3D-spatial summarizer (165b). The stitching engine (166) generates the ROI centric image (802) based on the received plurality of objects from the object modifying engine (164)/ the target parameters estimator (164a) and the 3D-spatial summarizer (165b).

The various actions, acts, blocks, operations, or the like in the flow diagram (300, 400, 500, 600, 700, and 800) may be performed in the order presented, in a different order, or simultaneously. Further, in some embodiments, some of the actions, acts, blocks, operations, or the like may be omitted, added, modified, skipped, or the like without departing from the scope of the disclosure.

Figure 9:
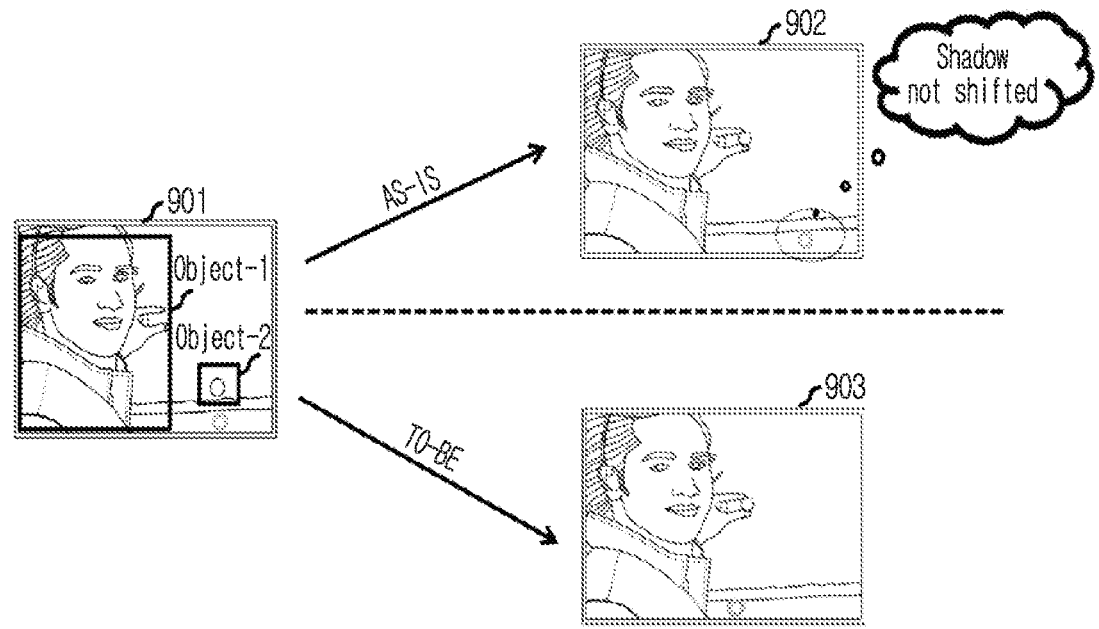
FIG. 9 is an example scenario illustrating a comparison between the existing image generation methods and the proposed method for automatically generating the ROI centric image, according to an embodiment of the disclosure.
Figure 9:
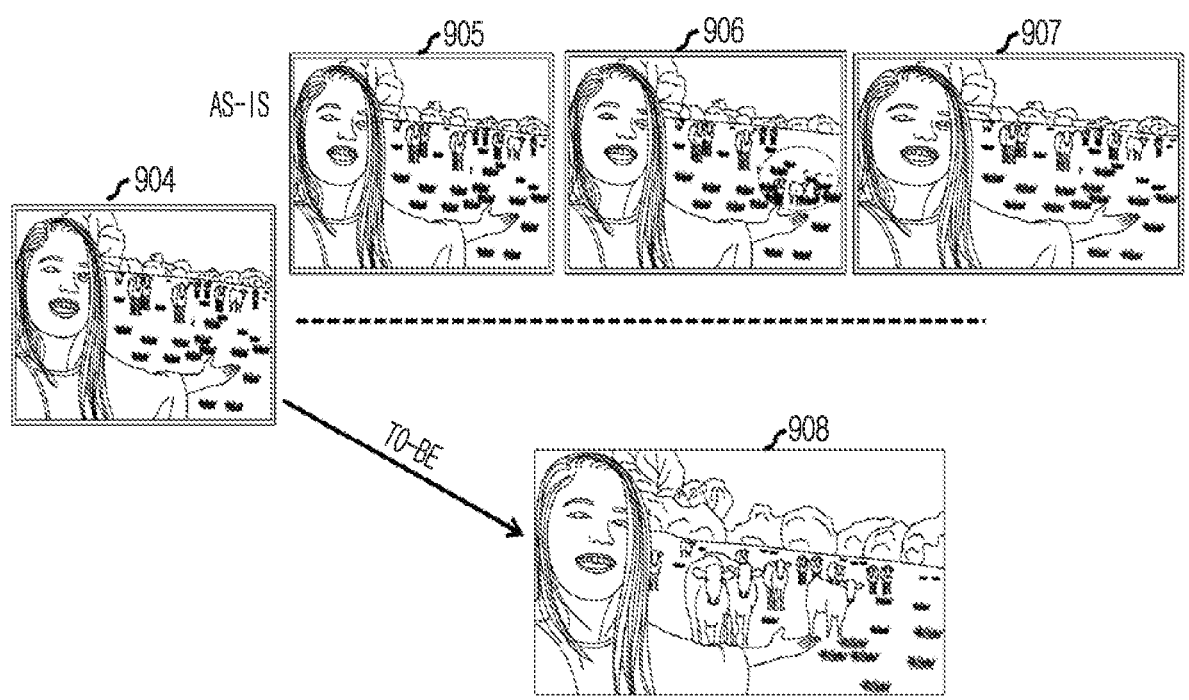

FIG. 9 is an example scenario illustrating a comparison between existing image generation methods and the proposed method for automatically generating the ROI centric image, according to an embodiment of the disclosure.

Consider an example scenario in which the user (object-1) of the electronic device wants to capture the image (901) of holding sun (object-2) on hand of the user. Using the existing method(s), the movement of an object is not prioritized (object-2 is moved but not its shadow), resulting in an unreal result (902). Using the proposed method/the 3D planar image controller (160), the sun (object-2) is positioned in a suitable location (holding the sun on the hand), and the influence of the movement of the object-2 is also considered by changing the sun's shadow in the image. As a result, the automatically created ROI centric image (903) contains more information and raises the aesthetic value of the taken image by taking into account an original viewpoint of the user of the electronic device (100), which improves the user's experience.

Consider an example scenario (904) in which the user (object-1/first ROI) is pointing towards the cows (object-2/ second ROI) to show them in the image but no emphasis can be given to the cows in the background since the cows are very far in the image. Using the existing method(s), the existing method(s) does not find a scope of improvement resulting in the same image (905) without any changes. Sometimes the existing method(s) moves the object(s) at an undesirable location which leads to inconsistency in the image (906). Sometimes the existing method(s) tries to bring the user and the cows together by shrinking an area in between through stretching the image (907) which makes the object(s) look out of shape. Using the proposed method/ the 3D planar image controller (160), Trees enlarged (object-3/second ROI), a redundant grassland layer (Object-4/non-ROI) was removed and the cows brought closer to the user. As a result, the automatically created ROI centric image (908) using the proposed method contains more information and raises the aesthetic value of the captured image by taking into account the original viewpoint of the user of the electronic device (100), which improves the user's experience.

The embodiments disclosed herein can be implemented using at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for automatically generating a Region Of Interest (ROI) centric image performed by an electronic device, the method comprising:
receiving, by the electronic device, at least one image frame, wherein the at least one image frame comprises a plurality of objects;
identifying, by the electronic device, at least one first ROI, at least one second ROI, and at least one non-ROI in the at least one image frame, wherein the identifying includes:

identifying the at least one first ROI based on an object importance score,
identifying the at least one second ROI based on an object of interest of the at least one first ROI, and
identifying the at least one non-ROI based on a highest redundancy score and the object importance score;
rescaling, by the electronic device, each ROI in the at least one image frame;
summarizing, by the electronic device, the at least one non-ROI in the at least one image frame, wherein the summarizing includes compressing repetitive object fragments in the at least one non-ROI; and
automatically generating, by the electronic device, the ROI centric image based on the rescaling and the summarizing.

2. The method of claim 1, further comprising:
detecting, by the electronic device, the plurality of objects presented in the at least one image frame, wherein the plurality of objects comprises three-dimensional (3D) location information;
determining, by the electronic device, two-dimensional (2D) coordinates information of the plurality of detected objects, wherein the 2D coordinates information comprises center information, height information, width information, and tag information, wherein the 2D coordinates information is detected by at least one Machine Learning (ML) model;
identifying, by the electronic device, a depth of the plurality of detected objects using at least one camera of the electronic device;
determining, by the electronic device, a relative distance between each object of the plurality of detected objects using a triangulation mechanism; and
identifying, by the electronic device, the 3D location information of the plurality of objects presented in the at least one image frame along with object categorization by using the 2D coordinates information, the identified depth of the plurality of detected objects, and the determined relative distance between each object,
wherein the tag information is used to categorize each object.

3. The method of claim 1, wherein the identifying of the at least one second ROI based on the object of interest of the at least one first ROI comprises:
determining, by the electronic device, a probability of interest of the at least one first ROI on each object based on a plurality of characteristics of each object;
ranking, by the electronic device, the determined probability; and
selecting, by the electronic device, at least one object having a highest rank, wherein the at least one object is used as the at least one second ROI to rescale.

4. The method of claim 3,
wherein the plurality of characteristics comprises:
relative position information between each object,
at least one surface of at least one object oriented towards at least one surface of at least one other object,
an extension of or a front surface of the at least one object oriented towards the at least one other object,
a relationship between each object, and
user-specific parameters, and
wherein the user-specific parameters comprise an image capturing pattern or history of a user of the electronic device.

5. The method of claim 1, further comprising:
generating, by the electronic device, a scene graph associated with the plurality of objects;
applying, by the electronic device, a relation classifier on the generated scene graph; and
determining, by the electronic device, a relationship between each pair of objects of the plurality of objects using the relation classifier.

6. The method of claim 1, wherein the rescaling, by the electronic device, of each ROI in the at least one image frame comprises:
extracting, by the electronic device, a relationship between each pair of objects of the plurality of objects;
determining, by the electronic device, an actual size of each object presented in the at least one image frame and an actual Z-order of each object presented in the at least one image frame;
generating, by the electronic device, a scene graph based on the plurality of detected objects and the actual size of each object;
generating, by the electronic device, a textual knowledge graph based on the extracted relationship between each object and the actual Z-order of each object; and
rescaling, by the electronic device, the actual size of each ROI and the actual Z-order of each ROI by using the generated scene graph and the generated textual knowledge graph.

7. The method of claim 1, wherein the summarizing, by the electronic device, of the at least one non-ROI in the at least one image frame comprises:
determining, by the electronic device, an object importance score associated with each object;
masking, by the electronic device, each object based on 3D location information;
determining, by the electronic device, the at least one non-ROI based on the object importance score;
determining, by the electronic device, a highest redundancy score associated with the at least one non-ROI, wherein the highest redundancy score is determined by at least one Machine Learning (ML) model; and
summarizing, by the electronic device, the at least one non-ROI in the at least one image frame, wherein the at least one non-ROI has the highest redundancy score.

8. The method of claim 1, wherein the automatically generating, by the electronic device, the ROI centric image comprises:
identifying, by the electronic device, the plurality of objects in the at least one image frame, wherein the plurality of objects comprises the at least one rescaled-first ROI, the at least one rescaled-second ROI, and the at least one summarized non-ROI;
stitching, by the electronic device, the identified plurality of objects to generate the ROI centric image; and
automatically generating, by the electronic device, the ROI centric image.

9. An electronic device for automatically generating a Region Of Interest (ROI) centric image, the electronic device comprising:
memory storing one or more computer programs;
one or more processors; and
a three-dimensional (3D) planar image controller, operably connected to the memory and the processor,
wherein the one or more computer programs include computer-executable instructions that, when executed by the one or more processors individually or collectively, cause the electronic device to:

receive at least one image frame, wherein the at least one image frame comprises a plurality of objects, identify at least one first ROI, at least one second ROI, and at least one non-ROI in the at least one image frame, rescale each ROI in the at least one image frame, summarize the at least one non-ROI in the at least one image frame, wherein, to summarize the at least one non-ROI, the one or more computer programs further include computer-executable instructions that, when executed by the one or more processors individually or collectively, cause the electronic device to compress repetitive object fragments in the at least one non-ROI, and automatically generate the ROI centric image based on each ROI being rescaled and the at least one non-ROI being summarized, wherein the electronic device further comprising:
an Object Of Interest (OOI) detector configured to identify the at least one first ROI based on an object importance score, the at least one second ROI based on an object of interest of the at least one first ROI, and the at least one non-ROI based on a highest redundancy score and the object importance score.

10. The electronic device of claim 9 further comprising:
a scene identifier of the 3D planar image controller configured to:
detect the plurality of objects presented in the at least one image frame, wherein the plurality of objects comprises three-dimensional (3D) location information, determine two-dimensional (2D) coordinates information of the plurality of detected objects, wherein the 2D coordinates information comprises center information, height information, width information, and tag information, and wherein the 2D coordinates information is detected by at least one Machine Learning (ML) model, identify a depth of the plurality of detected objects using at least one camera of the electronic device, determine a relative distance between each object of the plurality of detected objects using a triangulation mechanism, and identify the 3D-location information of the plurality of objects presented in the at least one image frame along with object categorization by using the 2D coordinates information, the identified depth of the plurality of detected objects, and the determined relative distance between each object, wherein the tag information is used to categorize each object.

11. The electronic device of claim 9, wherein the ML model comprises a CenterNet model.

12. The electronic device of claim 9, wherein the ML model comprises a You only look once (YOLO) model.

13. The electronic device of claim 9 further comprising:
an Object Of Interest (OOI) detector of the 3D planar image controller configured to:
determine a probability of interest of the at least one first ROI on each object based on a plurality of characteristics of each object, rank the determined probability, and select at least one object having a highest rank, wherein the at least one object used as the at least one second ROI to rescale.

14. The electronic device of claim 13,
wherein the plurality of characteristics comprises:
relative position information between each object, at least one surface of at least one object oriented towards at least one surface of at least one other object, an extension of or a front surface of the at least one object oriented towards the at least one other object, a relationship between each object, and user-specific parameters, and wherein the user-specific parameters comprise an image capturing pattern or history of a user of the electronic device.

15. The electronic device of claim 9, further comprising:
an object relation detector,
wherein the object relation detector is configured to:
generate a scene graph associated with the plurality of objects, apply a relation classifier on the generated scene graph, and determine a relationship between each pair of objects of the plurality of objects using the relation classifier.

* * * * *